United States Patent [19]
Stankewich, Jr.

[11] 3,764,523
[45] Oct. 9, 1973

[54] NITRIFICATION OF BOD-CONTAINING WATER

[75] Inventor: Michael Joseph Stankewich, Jr., North Tonawanda, N.Y.

[73] Assignee: Union Carbide Corporation, New York, N.Y.

[22] Filed: May 1, 1972

[21] Appl. No.: 249,159

[52] U.S. Cl............................ 210/5, 210/7, 210/11, 210/15
[51] Int. Cl............................................... C02c 1/10
[58] Field of Search................................... 210/3–9, 210/11, 14, 15

[56] References Cited
UNITED STATES PATENTS
3,401,113   9/1968   Pruessner et al. ............... 210/15 X
3,412,017   11/1968   Abson et al............................ 210/7
3,547,812   12/1970   McWhirter ............................ 210/7
3,654,147   4/1972   Levin et al............................... 210/6

OTHER PUBLICATIONS
Echelberger, W. F., Jr., Waste Water Treatment for Complete Nutrient Removal, Water & Sewage Works, Oct. 2969, pp. 396–402.

Primary Examiner—Michael Rogers
Attorney—Paul A. Rose et al.

[57] ABSTRACT

A method for removing both carbon and nitrogen food from BOD-containing water by biochemical oxidation using oxygen gas in the presence of activated sludge, where the carbon food and carbon-consuming microorganisms only are removed in a first zone and a feed stream comprising at least the first zone effluent and containing $BOD_5$ of 20–100 ppm. is passed to the nitrification zone where a combined sludge is formed with both carbon and nitrogen-consuming microorganisms.

15 Claims, 6 Drawing Figures

NITRIFICATION OF BOD-CONTAINING WATER

BACKGROUND OF THE INVENTION

This invention relates to a method for bio-chemically treating BOD-containing water by oxygenation to remove both the carbon and nitrogen food from such water and thereby minimize the latter's oxygen demand. The BOD-containing water may for example be municipal sewage, or chemical waste from petrochemical or paper plants, or a combined wastewater.

It is well known that the carbon - bearing material or substrate (hereinafter referred to as "carbon food") in wastewater exerts an oxygen demand that can be satisfied to almost any desired degree by secondary wastewater treatment. It is only recently becoming clear that the typical waste-water stream contains nitrogen-bearing material or substrate (hereinafter referred to as "nitrogen food") that can exert an additional oxygen demand approximately equivalent to that of the carbon food. Nitrogen food is generally present as $NH_4^+$ in the wastewater. Often to satisfy waste water effluent requirements, it is necessary not only to remove the bulk of the carbon food but also significant portions of the nitrogen food. Secondary waste treatment with an air aerated activated sludge system to remove both carbon and nitrogen food demands are known in the art, with the options of either combined single-stage treatment or separate stage treatment for the carbon and nitrogen food removal.

Successful treatment of wastewater with an activated sludge process involves the careful control of process conditions to grow and maintain a microorganism population that will consume the objectionable waste material. This task involves the careful regulation of parameters such that the "population dynamics" of the system result in the desired wastewater treatment. For example, if it is desired to remove the carbonaceous oxygen demand of the wastewater, an activated sludge must be maintained that will consume the carbonaceous material. As the microorganisms consume the carbon-bearing waste material, they will utilize dissolved oxygen in the water for their growth and metabolism. Additionally, they will consume some other nutrients (nitrogen and phosphorous) in the wastewater as they are needed for net sludge growth. For steady-state conditions, some sludge must be removed from the system for further treatment and disposal. However, the population dynamics of the system require that the sludge wasting rate must not exceed the sludge growth rate. Obviously, if the sludge waste rate does exceed the growth rate, the activated sludge system suffers a depletion of active microorganisms and eventually would lose the ability to properly treat the wastewater.

It is also well known that the successful removal of carbonaceous and nitrogenous oxygen demand of wastewater by an activated sludge system requires different species of microorganisms or activated sludge. Further, it is known that the growth rate of each species is a different function of the process parameters. Since at equivalent parameters, the growth rate of nitrogen-consuming microorganisms (nitrifiers) is slower than the growth rate of carbon-consuming microorganisms, the population dynamics of the nitrifiers are limiting for design purposes. This means that in a single stage system the growth rate of the carbon-consuming microorganisms must be purposefully reduced until it is equal to or less than the growth rate of the nitrifiers. When this is done, the carbon-consuming microorganism growth rate is brought into balance with the growth rate of the nitrifiers and then the steady-stage sludge wasting is equivalent to the steady-stage growth of the microorganisms. At these conditions, the single-stage activated sludge system will simultaneously maintain both carbon and nitrogen consuming microorganisms. This type of single-stage activated sludge process will remove both the carbonaceous and nitrogeneous oxygen demand of the wastewater, but due to the nitrifier growth rate limitation the system is much less efficient than a system only intended for removal of carbon food.

Further, the combined single-stage system exposes all microorganisms to the raw wastewater. This is especially disadvantageous to the steady maintenance of the nitrifier microorganism population which tends to be very susceptible to destruction by toxic elements in the wastewater, such as certain metal ions.

To overcome these problems, the prior art has also employed two separate air aerated sludge systems with the first stage removing the carbon food of the wastewater and the second stage removing the nitrogen food. Such two stage systems have been operated so as to yield a first stage sludge composed primarily of carbon-consuming microorganisms and a second stage sludge composed primarily of nitrogen-consuming microorganisms. However, since the nitrifier growth rate is slow, extremely long sludge retention times have been required. Moreover in view of nitrogen microorganisms' sensitivity to toxic elements and their inherent slow growth rate, it has been difficult to maintain the necessary population for nitrifier growth. Finally, nitrifiers do not settle nearly as rapidly as carbon-consuming microorganisms so that a substantial fraction of the former are often lost in the clarifier effluent.

A further disadvantage of prior art systems is that the solids concentrations have been relatively low, so that the nitrifier concentrations were also low.

An object of this invention is to provide an improved method for biochemical treatment of BOD-containing water to remove nitrogen food.

Another object is to provide such a method that is not limited by the relatively low growth rate of nitrogen-consuming microorganisms.

Still another object is to prvide an improved method that permits a higher degree of nitrogen food separation from BOD-containing water than heretofore attained, preferably with lower liquid contact times.

Other objects and advantages of this invention will be apparent from the ensuing disclosure and appended claims.

SUMMARY

This invention relates to a method for treating BOD-containing water by aeration in contact with activated sludge, settling sludge from the aeration and recycling sludge to the aeration zone as the activated sludge wherein the carbon food in the water is biochemically oxidized with at least 50 percent oxygen (by volume) feed gas. In the improvement of this invention, a feed stream comprising at least in part the carbon-depleted effluent water is passed to a nitrification zone. The feed stream has sufficient carbon food and carbon-consuming microorganisms and non-viable material for a total $BOD_5$ of 20–100 ppm., and also has nitrogen food. At least 50 percent oxygen (by volume) feed gas and nitrifying sludge recycle are introduced to the nitrification zone and the fluids are mixed therein and one fluid is simultaneously recirculated against the other fluids to form oxygenated liquor having (a) volatile suspended solids (MLVSS) population comprising both 2–40 percent nitrogen consuming microorganisms, and 98–60 percent carbon-consuming microorganism plus non-viable material, and (b) suspended solids content (MLSS) of 2,000–10,000 ppm. with MLVSS/MLSS of at least 0.4, for a liquid contact time of 30–240 minutes. The dissolved oxygen content (DO) of the liquor is maintained at least at 2 ppm. during the mixing and recirculating.

Oxygen-depleted aeration gas of at least 20 percent oxygen content is released from the nitrification zone, and nitrifying sludge from the zone is settled and wasted at rate such that the sludge retention time (SRT) in the nitrification zone is 3–20 days, with part being recycled as the nitrifying sludge recycle. The carbon food, non-viable material and carbon-consuming microorganisms/biomass ratio (hereinafter referred to as the "food/biomass ratio") is maintained at 0.03–0.60 pounds $BOD_5$/day $x$ pound volatile suspended solids (MLVSS).

In one specific embodiment wherein the food/biomass ratio in the aeration (carbon food removal) zone is relatively high, i.e. 0.8–2 (hereinafter referred to as the "high rate embodiment"), the carbon-depleted effluent water from the aeration zone comprises the entire feed stream to the nitrification zone and has 25–100 ppm. $BOD_5$, and the food/biomass ratio is maintained at 0.12–0.50.

In another specific embodiment wherein the food/biomass ratio in the aeration zone is relatively low, i.e., 0.3–0.8 (hereinafter referred to as the "low rate embodiment"), the feed stream to the nitrification zone comprises the carbon-depleted effluent water and a secondary $BOD_5$ source. The latter may for example be a minor portion of the BOD-containing water untreated in (and bypassed around) the aeration (carbon food removal) zone. This secondary $BOD_5$ source may alternatively comprise a minor portion of the settled activated sludge from the aeration zone or a minor portion of aeration zone liquor.

As used herein, the term "$BOD_5$" refers to the biochemical oxygen demand for a given sample measured after a five day incubation period in accordance with the standardized procedure outlined in "Standard Methods for the Examination of Water and Wastewater," American Public Health Association, Inc., New York 1971 (pages 489–495). All other measurements set forth hereinafter were made following the standardized procedures outlined in this publication. The $BOD_5$ measurement (based on seed sludge not including nitrifiers) includes carbon food (appearing as soluble material), non-viable material and carbon-consuming microorganisms (both appearing as volatile suspended solids), but not nitrogen food or nitrogen-consuming microorganisms.

This invention realizes the aforestated objects and as compared to prior art nitrification systems, tests have demonstrated better settling characteristics for the nitrifier-containing sludge, lower loss of solids in the clarifier effluent, and steady state nitrification.

DESCRIPTION OF PREFERRED EMBODIMENTS

Figure 1:
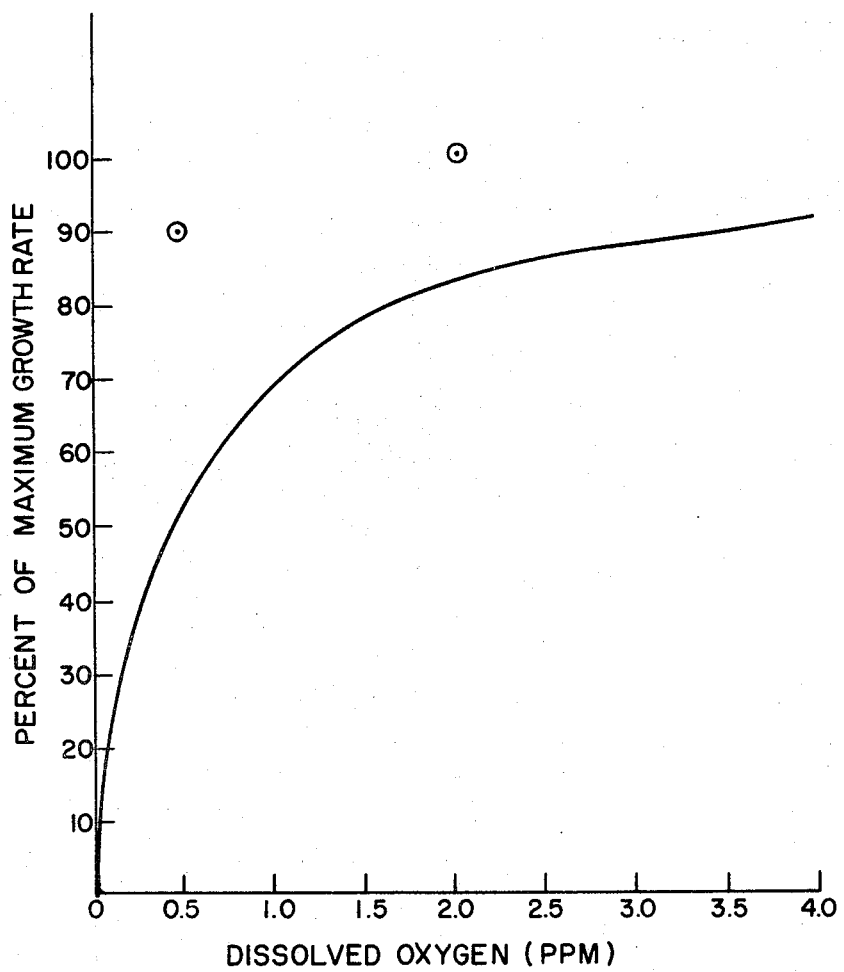
FIG. 1 is a graph showing the effects of dissolved oxygen concentration on the growth of both nitrogen and carbon-consuming microorganisms.

U.S. Pat. No. 3,547,812 issued Dec. 15, 1970 to J. R. McWhirter describes an improved system for biochemically treating BOD-containing water by at least 60 percent (by volume) oxygen gas in contact with active biomass (activated sludge) to form liquor. The mixing is continued while simultaneously maintaining: (a) the oxygen feed gas to mixing plus gas-liquor contact energy ratio at 0.03–0.40 lb. moles oxygen per horsepower hour of energy supplied, (b) the aeration gas above the liquor at oxygen partial pressure of at least 300 mm. Hg but below 80 percent oxygen (by volume) while consuming at least 50 percent (by volume) of the feed gas oxygen in the liquor, (c) the dissolved oxygen concentration of the liquor at below 70 percent of saturation with respect to the oxygen in the aeration gas but above about 2 ppm. and (d) continuously recirculating one of the aeration gas and liquor fluids in intimate contact with the other of the fluids in the aeration zone. Oxygenated liquor is thereafter withdrawn from the aeration zone and preferably separated into cleaned effluent water and activated sludge, a portion of the latter being recycled to the aeration zone.

U.S. Pat. No. 3,547,815 issued Dec. 15, 1970 to J. R. McWhirter describes another improved system for biochemically treating BOD-containing water by at least 50 percent (by volume) oxygen gas in contact with active biomass. In this McWhirter gas-staged system, the oxygen feed and other fluids are mixed and one fluid is simultaneously continuously recirculated in a first gaseous oxygen stage to form first oxygenated liquor and first unconsumed oxygen-containing gas. The latter is discharged from the first stage and mixed with aqueous liquid-solid in a second stage and one of the fluids is also continuously recirculated against the other fluids in the second stage. Although only two gas stages are essential, it is often desirable to provide additional gas stages and operate same in a manner analogous to the first two stages. If the system is within an enclosed chamber, it is also preferred to flow the oxygenated liquor from stage-to-stage cocurrent (in the same direction as) the gas staging.

Both of these oxygen biochemical treatment systems offer important advantages as compared with conventional air aeration of wastewater, for removal of carbon food. The advantages for example include smaller aeration equipment, lower power costs, lower capital investment, lower sludge handling costs and less land space. However, these stream to the second or nitrification zone, comprising systems have the same disadvantages as the aforedescribed prior art air aeration systems for removal of nitrogen food, i.e., the nitrifier growth rate limitation if a single zone is used for both types of food, and the instability and sensitivity of a separate zone for nitrification only.

It has now been discovered that these problems can be overcome by a two step process in which the water is first treated in an aeration zone using oxygen gas as taught by the referenced McWhirter patents, to remove at least a major portion (typically 80 percent for municipal sewage in the high rate embodiment) of the wastewater oxygen demand due to carbon food (as measure by customary $BOD_5$ determination). The second step feed comprises at least the first step effluent and for the low rate embodiment another $BOD_5$ source. This residual unsatisfied oxygen demand can be any combination of three possible forms: the carbon food (soluble $BOD_5$), or non-viable material or the carbon-consuming microorganisms (both as suspended solids as indicated in total $BOD_5$). If in the form of carbon food or non-viable material, the residual oxygen demand is noted as both are utilized by the carbon-consuming microorganisms for cell synthesis or as an energy source. If in the form of carbon-consuming microorganisms, the oxygen demand is noted as the carbon-consumers entering the endogenous respiration (auto-oxidation) phase of self-consumption.

Irrespective of the specific form, the feed stream to the second or nitrification zone, comprising at least the carbon-depleted effluent water from the first aeration (carbon removal zone) has 20–100 $BOD_5$ and nitrogen food which is not removed in the first zone. In the high rate embodiment (i.e., high food/biomass ratio) the entire $BOD_5$ is derived from the carbon-depleted effluent water. One advantage of this embodiment is that the necessary liquid contact time can be significantly lower than it would be in a low rate first zone that removed substantially all of the oxygen demand due to carbonaceous material.

The second or nitrification zone of this invention is purposefully operated to maintain an activated sludge composed of a combined population of carbon-consuming and nitrogen-consuming microorganisms. The carbon-consumers are sustained by any residual carbon food and by endogenous respiration in the feed stream, and the nitrogen-consumers are sustained by the nitrogen food in the same feed stream, which of course has not been consumed in the first aeration zone. The growth rate of nitrogen-consuming microorganisms (nitrifiers) is a function of the process parameters in this second nitrification zone, and for steady state operation the population dynamics of the zone require that the sludge wasting not exceed the nitrifier growth rate. As previously indicated, the growth rate of nitrifiers is low so that in the prior art two stage system with substantially only nitrifiers in the second stage, the sludge wasting from the second stage has also been low. Moreover in view of its poor settlability, loss of nitrifiers (as suspended solids) in the effluent of the second stage clarifier (at least 10–30 ppm.) had represented a significant loss from the system relative to the growth rate. As a result, it had been difficult to establish and maintain a large population of nitrifiers in the second stage aeration basin.

In this invention, the oxygenated liquor in the nitrification zone has volatile suspended solids (MLVSS) population comprising both 2–40 percent nitrogen-consuming microorganisms and 98–60 percent carbon-consuming microorganisms plus non-viable material. It has unexpectedly been discovered that such addition of such carbon-consuming microorganisms and/or non-viable material to the nitrification zone in the presence of at least 50 percent (by volume) oxygen feed gas alleviates the prior art problems in several respects. First, the carbon-consuming microorganisms and/or non-viable material, even in the presence of 2–40 percent nitrogen-consuming microorganisms, settle more rapidly than the nitrifiers and further appear to act as "holdfasts" for the nitrifiers. The effect is that the at least two-species sludge has better settling characteristics than the single-species nitrifiers. As a result, the clarifier performance is significantly improved with the combined sludge, and the residual suspended solids (including both species of microorganisms) in the clarifier effluent is reduced (see for example Table 3).

Another advantage of this two stage process is the dilution effect of the carbon-consuming microorganisms and/or non-viable material in the combined sludge serves to reduce clarifier effluent losses of the nitrifiers. That is, if the clarifier performance is such that it can remove suspended solids down to a given level (i.e., suspended solids of about 10–30 ppm.), the combined sludge system will have fewer losses of any one species. The result is that the nitrifier microorganism population necessary for steady-state nitrification is more easily established and maintained with this combined sludge system than with the single species (nitrifier) sludge system.

Still another essential aspect of this invention is the introduction of at least 50 percent oxygen (by volume) gas to the nitrification zone in sufficient quantity, along with the mixing and simultaneous fluid recirculation, to maintain the dissolved oxygen content of the liquor at least at 2 ppm. The importance of this requirement is illustrated in FIG. 1, a graph of the nitrifier growth rate (as the ordinate) as a function of the dissolved oxygen content (as the abscissa) at 25°C. The growth rate increases rather rapidly from 0 to about 2 ppm. DO, and at the latter has achieved about 82 percent. In contrast the carbon-consuming microorganisms do not require this relatively high DO level to realize such high growth level, as demonstrated by the two points at 90 percent and 100 percent of maximum growth rate. By way of comparison, the carbon-consuming microorganisms achieve 90 percent of maximum growth rate at only 0.5 ppm. DO. Because of the nitrogen dilution factor, a DO of 2 ppm. is much more difficult (and expensive) to maintain in an air aerated nitrification zone than in the enriched-oxygen aerated nitrification zone of this invention. Moreover FIG. 1 demonstrates that the maintaining of high DO levels (at least 2 ppm. and preferably at least 4 ppm. to achieve 90 percent of the maximum nitrifier growth rate) is even more important in the nitrification zone of this invention than in carbon-removing zones where at least 50 percent oxygen (by volume) is employed as the aeration gas.

The total suspended solids content (MLSS) in the nitrification zone is maintained at 2,000–10,000 ppm.

and preferably 3,000–7,000 ppm. Such high solids concentrations permit smaller chambers and piping. Of the total solids content, at least 40 percent represents volatile suspended solids content (MLVSS) having oxygen demand. The use of at least 50 percent oxygen (by volume) feed gas to the nitrification zone provides the necessary oxygen for biochemical oxidation with such highly concentrated MLVSS in reasonably short liquid contact time (30–240 minutes); this could not be accomplished using air as the aeration gas.

The net sludge wasting rate from the nitrification zone (i.e., the portion of activated sludge withdrawn and not recycled) is determined by the nitrifier population dynamics, but the population dynamics of the carbon-consuming microorganisms must also be properly controlled so that they are not depleted to a level where they no longer act as "holdfasts" for the nitrifiers and dilute the clarifier effluent losses of the nitrifiers. Accordingly, the carbon-consuming microorganisms and non-viable material comprise at least 60 percent of the volatile suspended solids (MLVSS) population. Of this 60 percent, carbon-consuming microorganisms preferably comprise 10–90 percent and the balance non-viable material. On the other hand, the carbon-consuming microorganism and non-viable material population in the MLVSS must not be so high that they force out the nitrifiers into the clarifier effluent, and for this reason the total should not exceed 98 percent. This means that the MLVSS population must include at least 2 percent nitrogen-consuming microorganisms or nitrifiers, not more than 40 percent of same and preferably not more than 25 percent nitrifiers.

The carbon-consuming microorganism and non-viable material population is controlled by regulating the total $BOD_5$ in the feed stream entering the nitrification zone in the range of 20–100 for all embodiments, preferably 25–100 and most preferably 30–60 $BOD_5$ for the high rate embodiment. For the low rate embodiment the range is preferably 20–80 $BOD_5$.

It has been also indicated that the broadest aspect of the invention requires a carbon food and carbon-consuming microorganism/biomass ratio in the nitrification zone of 0.03–0.60 pounds $BOD_5/x$ pound volatile suspended solids (MLVSS). In the high rate embodiment it is preferably 0.12–0.50 and most preferably 0.2–0.4, whereas for the low rate embodiment the ratio is preferably 0.05–0.50. The reason for these differences relates to differences in quantity of $BOD_5$, depending on the source of same, to produce the same quantity of carbon-consuming microorganisms (comprising part of the MLVSS) in activated sludge. In the high rate embodiment the sole source of $BOD_5$ entering the nitrification zone is the carbon food in the effluent water from the aeration (carbon-removing) zone. The $BOD_5$ sludge production yield coefficient is such that about 1.67 lbs. of carbon food-type $BOD_5$ is required to produce 1 lb. of carbon-consuming microorganisms. On the other hand, experimental results indicate that the $BOD_5$ requirement of carbon-consuming microorganisms or non-viable material is on the order of 0.6 lb. $BOD_5$/lb. carbon-consuming microorganisms or non-viable material. It is evident from these factors that 1.67 lb. of carbon food (soluble $BOD_5$) is equivalent to 1 lb. of carbon-consuming microorganisms or non-viable material (with a $BOD_5$ demand of 0.6 lbs.) with regard to maintenance of the combined sludge from the nitrification zone. These two extreme embodiments, i.e., were the nitrification zone feed $BOD_5$ comprises only carbon food on one hand and only carbon-consuming microorganisms and non-viable material on the other hand (with no carbon food) have F/M ratios which can differ by approximately 2.8 (i.e., 1.67 carbon food-type $BOD_5$/0.6 carbon-consuming microorganism type $BOD_5 = 2.8$). It should also be recognized that the entering $BOD_5$ may comprise any or all of: carbon food, non-viable material and carbon-consuming microorganisms.

To maintain a constant level of carbon-consuming microorganisms in the nitrification zone liquor which is necessary for practicing this invention, it must be recognized that these carbon-consumers may be lost through three factors: discharge in effluent water separated from the nitrification zone liquor (usually in a clarifier), endogenous respiration or self consumption where a carbon food deficiency exists, and in sludge wasted from the clarifier.

One important advantage of this invention as compared to the prior art single step system for removing both carbon and nitrogen consuming microorganisms in the same zone is that since the nitrification zone has a lower carbon related BOD removal requirement resulting in a lower fraction of carbon-consuming microorganisms and a higher fraction of nitrogen-consuming microorganisms, the necessary liquid contact times in the two zones (hence chamber sizes) are considerably lower than for the single step prior art system. This relationship is illustrated in Table I, comparing the process parameters in a single step combined carbon and nitrogen food removal system and a high rate embodiment of this invention. Each system is based on 90 percent

TABLE I

| Parameter | Combined One-Step | Two-Step Carbonaceous | Nitrification |
|---|---|---|---|
| Liquor Suspended Solids MLSS, (ppm) | 5065 | 4688 | 5835 |
| MLVSS/MLSS Ratio | 0.70 | 0.75 | 0.70 |
| Sludge Recycle/Influent Volume Ratio | 0.30 | 0.30 | 0.50 |
| Dissolved Oxygen in Liquor (ppm) | 6.0 | 6.0 | 6.0 |
| Liquid Contact Time (minutes) | 300 | 78 | 72 |
| Nitrifier population in Liquor ( %) | 2 | none | 8 |
| Influent Conditions (ppm) | | | |
| $BOD_5$ | 200 | 200 | 38 |
| TKN* | 30 | 30 | 21 |
| $NH_3$-N** | 20 | 20 | 18 |
| Suspended Solids, MLSS | 240 | 240 | 30 |
| Effluent Conditions (ppm) | | | |
| $BOD_5$ | 20 | 38 | 20 |
| TKN* | 5 | 21 | 3 |
| $NH_3$-N** | 1 | 18 | 1 |
| Suspended Solids, MLSS (clarifier) | 30 | 30 | 30 |
| Food-to-Biomass Ratio (lb. $BOD_5$/lb. MLVSS/day) | 0.27 | 1.05 | 0.18 |
| Sludge Retention Time (days) | 9.8 | 1.9 | 9.8 |
| Horsepower required (HP) | 580 | 200 | 250 |

Figure 3:
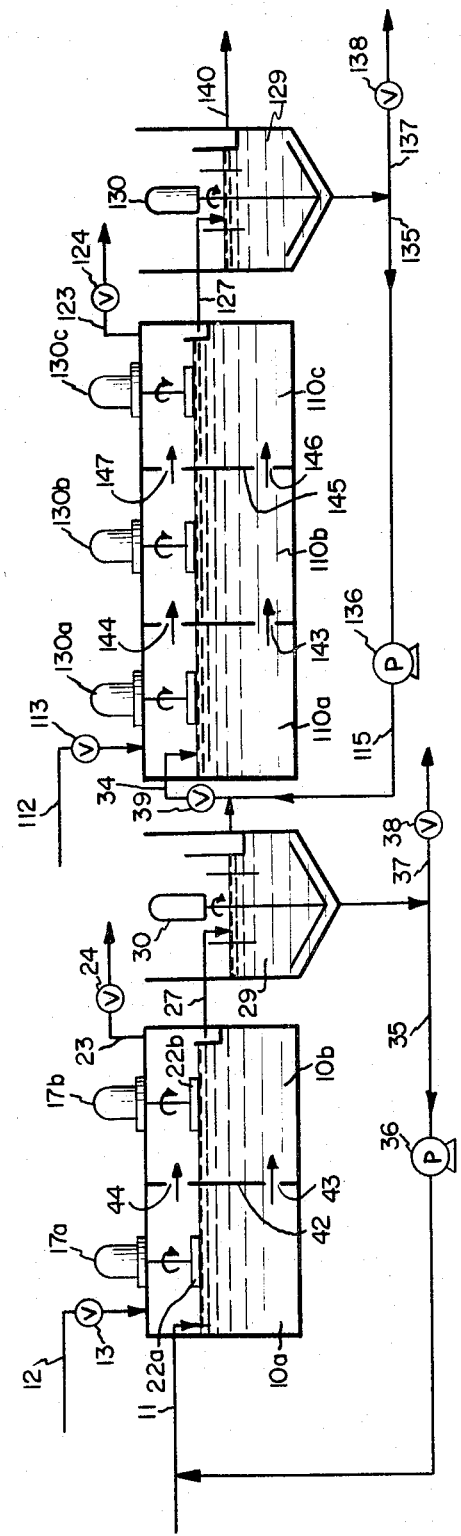
FIG. 3 is a schematic view taken in cross-sectional elevation of apparatus capable of practicing another high flow rate embodiment and having sub-zones in both the aeration (carbon-removing) zone and the nitrification zone.

*nitrogen food (total Kjeldahl nitrogen)
**ammonia-nitrogen oxygen (by volume) feed gas, four sub-zones in the single step system, and three sub-zones in both the carbon-removal aeration step and the nitrification step, all arranged for cocurrent gas-liquor flow as for example illustrated in FIG. 3. The vent gas comprises 50 percent $O_2$.

It will be apparent from a comparison of the liquid contact times that for these particular conditions the combined volume of the aeration zone and the nitrification zone need only be one-half that of the single step combined carbon and nitrogen food removal system.

Figure 2:
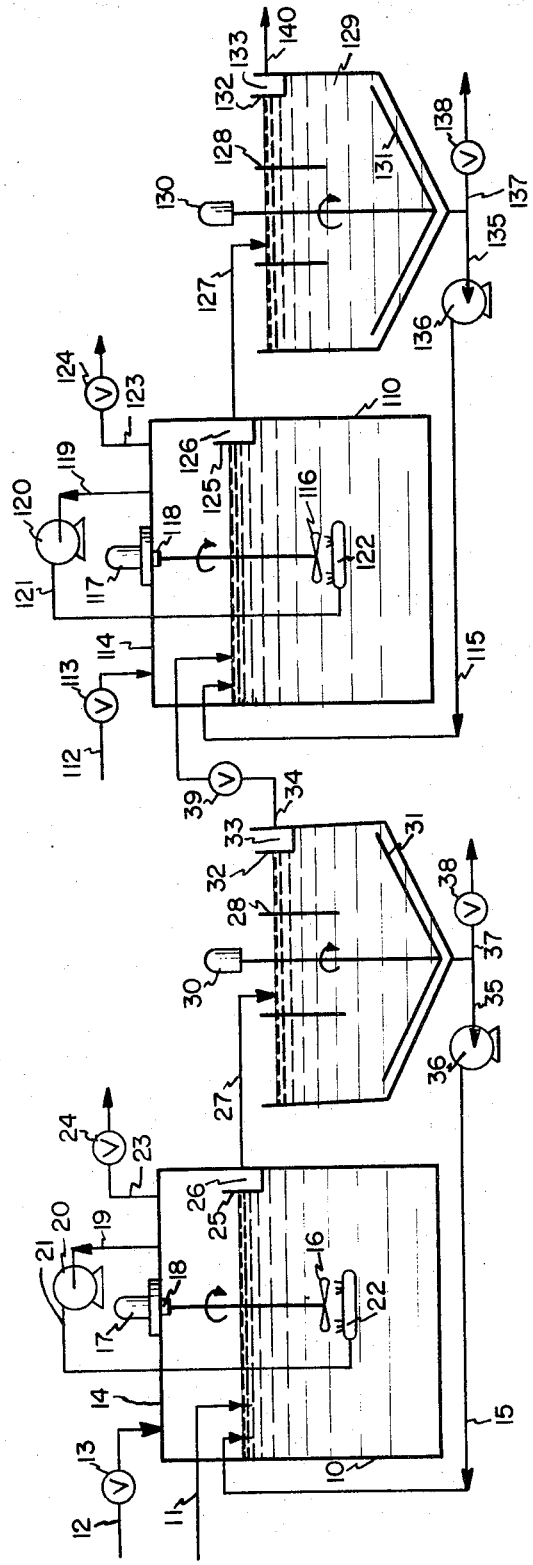
FIG. 2 is a schematic view taken in cross-sectional elevation of apparatus capable of practicing one high flow rate embodiment of the invention.

Referring now more specifically to the high flow rate embodiment of FIG. 2, BOD-containing water, as for example municipal sewage, enters chamber 10 comprising the first aeration or carbonaceous removal zone, through conduit 11. A source (not shown) of oxygen comprising at least 50 percent oxygen is provided and the oxygen gas is flowed therefrom through conduit 12 having control valve 13 therein to chamber 10. The latter is provided with gas-tight cover 14 to maintain an oxygen-enriched aeration gas environment over the liquor. Recycling activated sludge is also introduced to chamber 10 through conduit 15, although the BOD-containing feed water and sludge may be mixed prior to introduction in the chamber if desired.

The aforementioned streams are intimately mixed in chamber 10 by mechanical agitation means 16 driven by motor 17 having a shaft passing through seal 18 in the cover 14. Although the agitation means may comprise one or more impellers located near the liquor surface, it is illustrated as positioned below the surface. In this particular embodiment, oxygenating aeration gas disengaged from the liquor body into the overhead gas space is withdrawn through conduit 19 by blower 20 for compression and return through conduit 21 to submerged sparger of diffuser 22 preferably positioned beneath agitator 16. That is, the aeration gas is continuously recirculated in intimate contact with the liquor body in chamber 10. Blower 20 is driven by a motor (not illustrated) representing the gas-liquor contact energy, and is preferably provided with controls to permit adjustment of its speed of rotation. Oxygen-depleted or spent oxygenation gas is discharged from chamber 10 through restricted flow conduit 23 which may also be provided with flow control valve 24.

The BOD-containing water, oxygen-rich feed gas and sludge are mixed to form the mixed liquor, and the oxygenating gas is continuously recirculated into the liquor for dissolution. Inert gases such as nitrogen entering with the BOD-containing water and with the oxygen-rich feed gas, and gases such as $CO_2$ produced in the biochemical reaction are evolved and collected with unconsumed oxygen in the space above the liquor. This aeration gas has an oxygen partial pressure of at least 300 mm. Hg but preferably at least 380 Hg. The oxygen-rich gas may be continuously introduced to chamber 10 through conduit 12 during the mixing step, or the gas flow may be terminated when mixing is started. The oxygen-depleted aeration gas may be continuously or intermittently discharged from the overhead space through conduit 23.

The liquor level in chamber 10 is controlled by weir 25 which discharges into overflow trough 26 and thence through discharge conduit 27. Adjustments in DO level may be accomplished by varying the rate of oxygen-rich feed gas flow using valve 13 in conduit 12 thereby increasing or decreasing the oxygen partial pressure in the enclosure 10 gas space. The DO level may also be adjusted by varying the power input and speed of rotation of blower 20, thereby increasing or decreasing the rate of diffusion of oxygenated gas into the liquor. The DO level may also be controlled by varying the contact time of the liquor in chamber 10.

At the end of the mixing step, for example 18 to 180 minutes duration, oxygenated liquor is discharged through conduit 27 to within a central concentric baffle 28 of clarifier 29. Baffle 28 preferably extends from above the liquid level to a point intermediate to this level and the clarifier's conical bottom. Motor 30 drives a slowly rotating rake 31 across the clarifier bottom to prevent "coning" of the dense settled sludge. The partially purified supernatant liquid still with 20–100 ppm. $BOD_5$ overflows weir 32 into trough 33 and is discharged through conduit 34. The sludge is withdrawn from the clarifier bottom through conduit 35 and at least a portion thereof is pressurized by pump 36 for recycling in conduit 15 to enclosure 10 for inoculation of the incoming BOD-containing water. Any sludge not needed for recirculation is discharged through bottom conduit 37 having control valve 38 therein.

The partially purified effluent water from clarifier 29 in this high flow rate embodiment comprises the sole feed stream to the nitrification zone. The apparatus previously described in the context of the first aeration zone may be substantially duplicated as the nitrification zone. In FIG. 1, elements corresponding to those previously described have been identified by the same number plus 100, and the nitrification zone operates in an analogous manner to the first aeration zone, except for certain parameters discussed hereinafter in detail. In brief, the first aeration zone effluent in conduit 34 having control valve 35 therein, enters chamber 110 comprising the second nitrification zOne and is mixed therein with at least 50 percent (by volume) oxygen feed gas introduced through conduit 112 and nitrifying sludge recycle introduced through conduit 115 to form oxygenated liquor. In addition to nitrogen food (measured for example as Total Kjeldahl Nitrogen or TKN), the liquor has a volatile suspended solids population comprising both 2–40 percent nitrifiers and 98–60 percent carbon consumers plus non-viable material; and suspended solids content (MLSS) of 2,000–10,000 ppm. with MLVSS/MLSS of at least 0.4. These constituents are supplied by the feed stream, and by the nitrifying sludge recycle in conduit 115 at flow rate controlled by pump 136 and waste valve 138.

The dissolved oxygen content of at least 2 ppm. is maintained by oxygen feed valve 113 and recirculating blower 120. After the desired liquid contact time of 30–240 minutes the oxygenated liquor is withdrawn through conduit 127 to clarifier 129 for separation and wasting at rate such that the sludge retention time (SRT) is 3–20 days and preferably 5–15 days. As used herein, SRT is determined by dividing the total lbs. MLVSS in the nitrification zone by the lbs. MLVSS wasted from the zone through conduits 137 and 140, per day. Similarly, sludge retention time in the first aeration zone is determined by dividing the total lbs. MLVSS in that zone by the lbs. MLVSS wasted from the zone through conduits 37 and 34, per day. Also as used herein, liquid contact time refers to the total period in which a particular quantity of feed stream liquid is mixed with oxygen gas. By way of example, if the nitrification zone comprises two sub-zones in series flow relationship, the contact time is the sum total gas-liquor contact times for all subzones.

As previously indicated, the food-to-biomass ratio for the nitrification zone chamber 110 is maintained at 0.03–0.60 pounds $BOD_5$/day x lb. MLVSS, and preferably 0.12–0.50 and most preferably 0.2–0.4 in this high flow rate embodiment. This ratio is controlled in the FIG. 2 apparatus by nitrifying sludge recycle pump 136, waste sludge valve 138, and influent liquid valve 35. It should be noted that as used herein, the food-to-biomass ratio is an average value; where sub-zones are employed the ratio is based upon the sum of volatile suspended solids in all sub-zones. Where the liquor is staged through several sub-zones the ratio will vary from the average value, being higher in the initial treatment sub-zone and lower in the final treatment zone. By way of illustration, if four liquor nitrification sub-zones are employed with equal liquor flow rate and MLVSS but different liquor contact times $T_1$, $T_2$, $T_3$ and $T_4$, and corresponding food-to-biomass ratios are 0.4, 0.3, 0.2 and 0.1, the average ratio is
$(0.4T_1 + 0.3T_2 + 0.2 T_3 + 0.1T_4) / (T_1 + T_2 + T_3 + T_4)$ The FIG. 3 apparatus illustrates first aeration (carbonaceous removal) chamber 10 divided into two separate compartments 10a and 10b or sub-zones, and intermediate partition 42 extending from top to bottom for separation. Restricted opening 43 below the liquor level provides flow of partially oxygenated liquor from first compartment 10a to second compartment 10b; and restricted opening 44 in the aeration gas space provides flow of first oxygen-depleted aeration gas from 10a to 10b in cocurrent flow relation to the liquor.

Surface-type impellers 22a and 22b are provided in first and second compartments 10a and 10b respectively to throw sheets of liquor into the gas space for recirculation against the gas and simultaneously perform the liquid-solid mixing function. That is, in the FIG. 2 embodiment, aeration gas is recirculated against the liquor by pumps and reintroduced through subsurface spargers, while liquid-solid mixing is accomplished by sub-surface propellers. In the FIG. 3 embodiment, both fluid (liquid) recirculation and liquid-solid mixing are provided by the same mechanical device — motor-driven surface impellers.

Nitrification chamber 110 is constructed in an analogous manner to first aeration chamber 10, except that three separate compartments or sub-zones 110a, 110b and 110c are provided, with partition 145 separating second and third compartments 110b and 110c. Also, restricted sub-surface opening 146 in partition 145 facilitates flow of second further oxygenated liquor from second compartment 110b to third compartment 110c. Similarly, restricted opening 147 in the upper part of partition 145 allows flow of second further oxygen-depleted aeration gas cocurrently with the liquor, from 110b to 110c.

Third still further oxygenated liquor is discharged from third compartment 110c through conduit 127 to clarifier 129 for separation into nitrifying sludge and BOD-depleted effluent water. The latter is withdrawn through conduit 140 and the nitrifying sludge removed from the bottom through conduit 135. One part of the nitrifying sludge is recycled through connecting conduit 135 by pump 136 to conduit 115 for return to first compartment 110a of the nitrification zone. The balance of the nitrifying sludge is wasted through conduit 137 having control valve 138.

Figure 4:
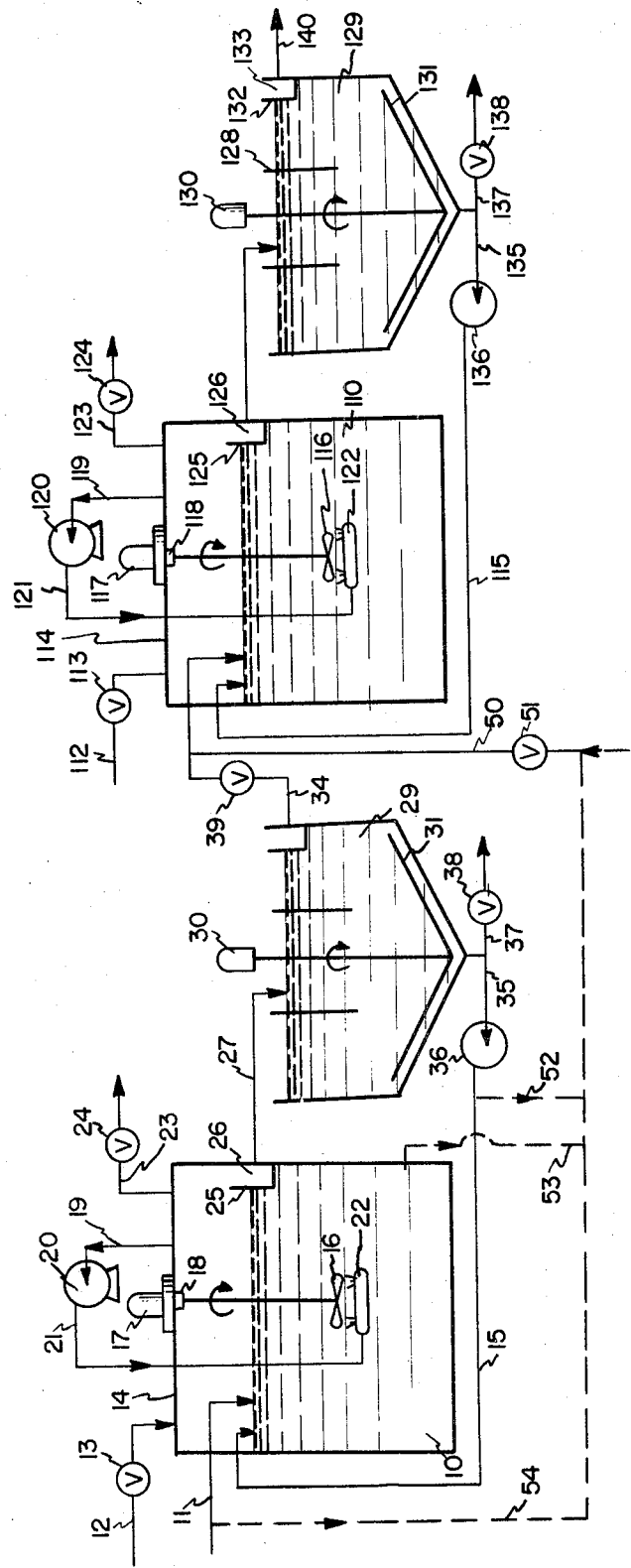
FIG. 4 is a schematic view taken in cross-sectional elevation of apparatus capable of practicing several low rate embodiments.

Whereas the FIG. 2 and 3 apparatus are suitable for the high (feed water) rate embodiment, FIG. 4 illustrates several possible modifications of FIG. 2 as low (feed water) rate systems wherein a secondary $BOD_5$ source is introduced through conduit 50 having control valve 51 therein, to supplement the carbon-depleted effluent water from the first clarifier 29 in conduit 34 thereby forming the feed (liquid) stream to chamber 110 as the nitrification zone.

The second $BOD_5$ supply may be provided from any of several sources, all shown as dotted conduits. For example, a portion of the carbon-depleted activated sludge from first clarifier 29 may be diverted from recycle conduit 15 by conduit 52 as a supply of carbon-consuming microorganisms. As a further alternative, a portion of the mixed liquor may be diverted from first aeration chamber 10 in conduit 53 as a supply of both carbon food and carbon-consuming microorganisms. If several sub-zones are used as for example illustrated in FIG. 3, the mixed liquor is preferably diverted from the first sub-zone 10a as the carbon food concentration is highest at the point in the zone. As a further alternative, a portion of the feed water to first aeration chamber 10 may be diverted from conduit 11 through conduit 54 as part or all of the secondary $BOD_5$ supply.

Still another source of the needed $BOD_5$ can be suspended solids from inefficient clarification in the first step. That is, the first step may be a relatively low rate treatment (F/M < 0.8) and remove essentially all of the oxygen demand due to carbon food. However, the clarifier 29 of FIGS. 2 and 3 could be operated in a manner such that suspended solids are retained in the effluent 34 and thereby supply the $BOD_5$ source. This could be accomplished by operating at higher than usual clarifier overflow rates and thereby reduce the clarifier size and cost but also its effectiveness.

Figure 5:
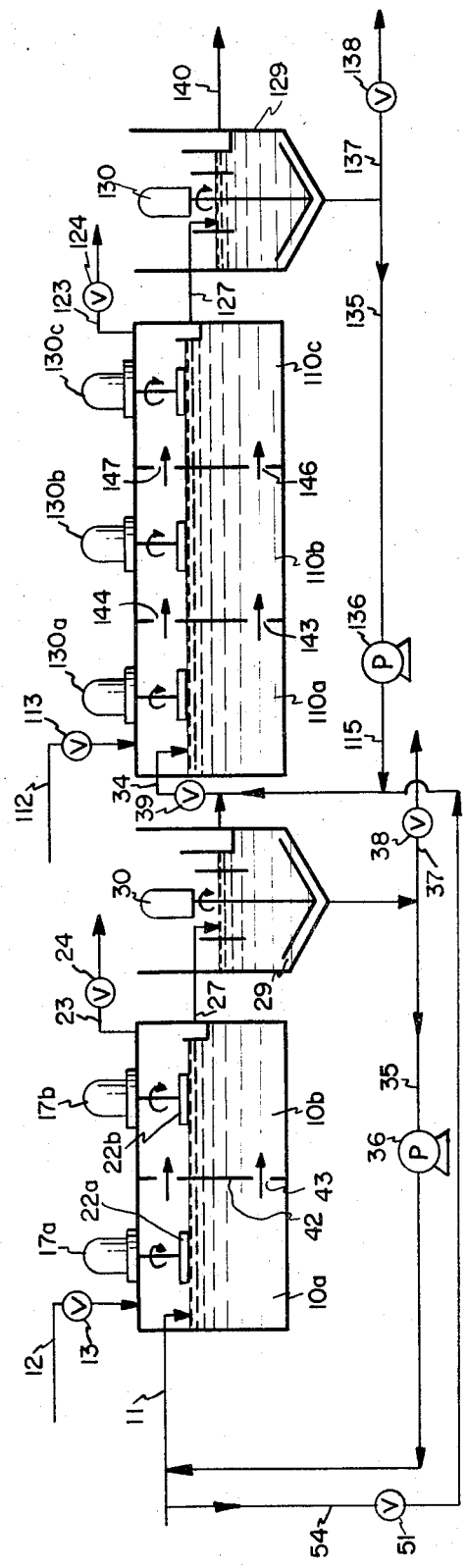
FIG. 5 is a schematic view takn in cross-sectional elevation of apparatus capable of practicing combined high-low rate embodiments of the invention.

FIG. 5 illustrates another embodiment which is a combination of the previously described high and low rate embodiments, offering significant advantages from standpoint maintaining a highly efficient system despite varying flow rates of wastewater to the first step. For example, waste-water treatment plants often operate with frequency and sometimes predictable flow patterns, such as relatively low rate at night and relatively high flow rate during the day, i.e., diurnal flow patterns.

The FIG. 5 system could be normally operated in the manner of a high rate first aeration step as for example described in connection with FIG. 3, but with control valve 51 partly closed in the feed bypass conduit 54. Valve 51 is used as a control feature to compensate for reduced or measured flows of $BOD_5$ from clarifier 29 into nitrification chamber feed conduit 34. Such control may for example be based on monitoring of the mixed liquor suspended solids in the nitrification first sub-zone 110a so as to maintain the volatile suspended solids at a constant level. That is, if the solids level were dropping, this would indicate a scarcity of $BOD_5$ and the feed bypass would be increased. Conversely, if the solids level were increasing, the feed bypass is decreased. Although FIG. 5 shows the feed water as the control stream, it should be recognized that any secondary $BOD_5$ source may be used including those illustrated in FIG. 4 and even a source entirely separate from system as described.

Table 2 summarizes key parameters for the first aeration (carbonaceous removal) and the second aeration (nitrification) steps of the total BOD-removal process. Only those parameters which are either significantly different for the two steps or essential to the claimed invention have been included. Moreover, the parameters listed for the first step are merely recommended and should not be considered as limiting the scope of the claimed invention. The remaining unlisted parameters are substantially the same as described in the aforementioned McWhirter patents. In general, the mixed liquor conditions in both steps are similar to the high rate biochemical oxidation of the McWhirter prior art. The use of a high oxygen content feed gas allows the maintenance of high mixed liquor dissolved oxygen concentration, and this in part results in a "healthy" sludge having good settling characteristics. Accordingly, the clarification step is able to produce high concentration sludge and relatively low recycle sludge/influent volume ratios are sufficient to maintain the desired mixed liquor concentrations.

One difference between the two steps is the suspended solids concentration (MLSS). Since the nitrification step mixed liquor contains a substantial fraction of inherently poor settling nitrogen food-consuming microorganisms, the settling characteristics of the combined liquor are not quite as good as the first zone liquor composed essentially of only carbon-consumers.

TABLE 2

| Parameter | Carbonaceous Removal | Nitrification |
|---|---|---|
| Liquor Suspended Solids, MLSS (ppm) | 4,000–12,000 | 2,000–10,000 |
| MLVSS/MLSS Ratio (Volatile Fraction) | <0.55 | <0.40 |
| Liquid Contact Time (minutes) | 18–180 (broad) | 30–240 (broad) |
|  | 30–90 (preferred) | 60–120 (preferred) |
| Sludge Retention Time (days) | <3 (broad) | 3–20 (board) |
|  | <2 (preferred) | 5–15 (preferred) |
| Food-to-Biomass Ratio (lbs.$BOD_5$/lb. MLVSS/day) |  |  |
| High Rate Embodiment | 0.8–2 (broad) | 0.12–0.50 (broad) |
|  | 1–1.8 (preferred) | 0.2–0.4 (preferred) |
| Low Rate Embodiment | 0.3–0.8 (broad) | 0.03–0.60 (broad) |
|  | 0.4–0.7 (preferred) | 0.05–0.50 (preferred) |
| Feed Liquid Conditions Total $BOD_5$ (ppm) |  |  |
| High Rate | not pertinent | 20–100 (broad) |
|  |  | 25–100 (preferred) |
|  |  | 30–60 (most preferred) |
| Low Rate | not pertinent | 20–100 (broad) |
|  |  | 20–80 (preferred) |
| Carbon Food in $BOD_5$ (ppm) |  |  |
| High Rate | not pertinent | 10–50 (broad) |
|  |  | 15–30 (preferred) |
| Low Rate | not pertinent | 3–80 (broad) |
|  |  | 5–50 (preferred) |
| Carbon Consummers in $BOD_5$ (ppm) |  |  |
| High Rate | not pertinent | 30–80 (broad) |
|  |  | 30–60 (preferred) |
| Low Rate | not pertinent | 5–100 (broad) |
|  |  | 10–80 (preferred) |

Accordingly, the allowable upper limit nitrification stage mixed liquor solids concentration (MLSS) is somewhat lower (10,000 ppm.) than the recommended first step upper limit (12,000 ppm.). Another difference in the mixed liquor suspended solids between the two steps is the volatile fraction. Since the sludge wasting from the nitrification step is generally lower than from the first step, there tends to be more buildup of inert solids in the second step, resulting in decreased volatile fraction (> 40 percent compared to >55 percent).

An important difference is that both the liquid contact times and sludge retention times (SRT) are greater for the nitrification step. The nitrification step SRT is preferably at least twice the SRT of the first aeration step. Both of these conditions are related to the slower growth rate for nitrifiers compared to the carbon-consumers. For a steady-state system the sludge growth rate must equal the sludge waste rate, and the latter determines the sludge retention time (i.e., lb. MLVSS/lb. VSS wasted/day = SRT). Accordingly, high sludge retention times are due to low sludge waste rates. For the nitrification step, the low growth rate of nitrifiers (typically 0.05 – 0.3 for nitrifiers compared to about 0.5 – 2.0 lb. growth/lb. sludge day for carbon-consumers) requires relatively long sludge retention times to maintain the mixed liquor and at the same time, the mixed liquor must be retained under aeration for significant time periods to allow biochemical oxidation of the food.

With respect to the food-to-biomass ratio, the F/M in the first aeration step is significantly higher than the nitrification step because the carbon food is introduced to the former and at least partly consumed therein. In the high rate embodiment the F/M in the first step is suggested at 0.8–2 so that there may be considerable residual $BOD_5$ in the feed to the nitrification zone with the F/M 0.12–0.50. Lower values will not sustain the carbon-consumers in the nitrification zone mixed liquor and under such conditions the activated sludge would eventually become predominantly nitrifiers. When this occurs, the poor settling characteristics would cause the nitrifiers to be lost in the clarifier effluent and the system would not nitrify. On the other hand, excessively high F/M ratios in the nitrification zone (above 0.50 for the high rate embodiment) would lead to an over-abundance of carbon-consumers and if the MLVSS were maintained at steady conditions, additional sludge wasting would be necessary and cause excessive loss of nitrifiers. The result would be loss of nitrifying capability.

For the low rate embodiment of the invention, a secondary source of $BOD_5$ is supplied to the nitrification step which may be mostly carbon-consumers or mostly carbon food. Due to the wide range of $BOD_5$ sources, the nitrification zone F/M ratio is quite broad (0.03 – 0.60), due to the lower $BOD_5$ demand of carbon-consumers which can be used as the secondary source instead of the higher $BOD_5$ demanding carbon food. The reasons for the upper and lower F/M limits for this low rate embodiment are similar to the high rate embodiment, i.e., to maintain steady-state MLVSS and nitrifying capability.

The advantages of this invention were also demonstrated in a pilot plant having three sub-zones as the first aeration step followed by a clarifier and three sub-zones as the nitrification step followed by a clarifier, all arranged for cocurrent gas-liquor flow with 99% oxygen (by volume) feed gas to each zone, similar to the fluid staging illustrated in FIG. 2. Each of the sub-zones was a cylindrical tank of 22½-inch diameter and 35-inch height with a liquid volume of about 45 U.S. gallons. Further, each of the sub-zones was equipped with a 6-inch diameter sparger — impeller gas — liquor mixing unit driven by a 1/3 HP electric motor. The sparger consisted of rotating arms equipped with 1/16-inch diameter orifices through which the oxygen gas was recirculated, similar to FIG. 2 except that impeller 16 and sparger 22 were mounted on a common shaft for rotation. The clarifiers were similar in design to those illustrated in the figures, the first step unit being 2.5 feet in diameter, 5 feet deep with a liquid volume of 170 U.S. gallons. The nitrification zone clarifier was 2 feet in diameter and 5 feet deep with a liquid volume of 110 U.S. gallons. The pilot plant facility had bypass capability to allow independent control of contact time in each of the two steps.

During pilot plant operation, the oxygen gas was introduced to the overhead space of the first sub-zone of each zone and maintained at slightly above atmosperic pressure and passed to succeeding sub-zones through interconnecting piping. Gas purities were measured with an oxygen analyzer and the waste gas from each enough carbon-consuming microorganisms in the nitrification step and the loss of suspended solids in the effluent could not be replenished. Further, since the carbon-consumer population was being decreased, the relative population of nitrifiers increased and resulted in poorer settling sludge. This factor is indicated by the high effluent suspended solids of the nitrification zone clarifier (48 ppm. MLSS).

TABLE 3

| Parameter | I* | | II* | | III** | |
|---|---|---|---|---|---|---|
| | C | $N_2$ | C | $N_2$ | C | $N_2$ |
| Liquor suspended solids, MLSS (ppm) | 9588 | 5380 | 8004 | 2587 | 6431 | 4134 |
| Liquor volatile suspended solids, MLVSS (ppm) | 6105 | 4063 | 5365 | 1974 | 4897 | 3128 |
| Liquor D.O., (ppm) | 9.9 | 12.6 | 14.0 | 12.9 | 9.0 | 7.4 |
| Liquid contact time, (minutes) | 98 | 163 | 48 | 88 | 29 | 88 |
| Sludge recycle/influent volume ratio | 0.83 | 1.11 | 0.30 | 0.57 | 0.27 | 0.57 |
| Food-to-biomass ratio, lbs. $BOD_5$/lb. MLVSS/day | 0.16 | 0.04 | 0.53 | 0.11 | 1.19 | 0.14 |
| Mean nitrogen loading, lbs. TKN/lb. MLVSS/day | — | 0.05 | — | 0.13 | — | 0.10 |
| Nitrifier population percent in MLVSS | — | 3.5 | — | 12.5 | — | 5.7 |
| Sludge retention time, days | 6.5 | 11.0 | 1.4 | 11.8 | 1.0 | 8.1 |
| Influent conc. (ppm): | | | | | | |
| $BOD_5$ | 67 | 17.5 | 96 | 13.5 | 119 | 27.7 |
| TKN | 25.6 | 21.3 | 22.8 | 16.3 | 27 | 19.5 |
| Suspended solids, MLSS | 68 | 27 | 137 | 20.9 | 150 | 49 |
| Effluent conc. (ppm): | | | | | | |
| $BOD_5$ | 17.5 | 26.5 | 13.5 | 19 | 27.7 | 11.8 |
| TKN | 21.3 | 4.3 | 16.3 | 4.0 | 19.5 | 3.3 |
| Suspended solids, MLSS (clarifier) | 27 | 48 | 20.9 | 24.6 | 49 | 30 |
| Percent removed in system: | | | | | | |
| $BOD_5$ | 60.4 | | 80.2 | | 90.1 | |
| TKN | 83.2 | | 82.5 | | 87.8 | |
| Suspended solids*** | 29 | | 82 | | 80 | |

*Phases I and II were not steady state; nitrifier population diminishing.
**Phase III was steady state; nitrifier population constant.
***Carbon and nitrogen consuming microorganisms, plus non-viable material removed.

of the two zones during these tests was 40 – 60 percent oxygen (by volume). The temperature of the mixed liquor was 66°–71°F and the pH in range of 634–6.8. In addition to the monitoring of gas and liquor flows by appropriate metering and recording equipment, several important parameters were measured to determine the system performance. Daily composite samples were obtained for the feed water, the first step clarifier effluent and the second step clarifier effluent. Grab sample composites of the mixed liquor sludge were taken daily for each step, and all analytical procedures for the samples were in accordance with the previously referenced "Standard Methods for the Examination of Water and Wastewater."

Table 3 summarizes the data from three representative phases of the pilot plant tests. Phase I operation was low feed rate into the first step (F/M=0.16) and resulted in efficient removal of the carbonaceous oxygen demand (effluent = 17.5 ppm. $BOD_5$), so that the second step received feed water having only 0.04 food-to-biomass ratio and its oxygen demand was primarily that of the nitrogen food and nitrifiers (3.5 percent nitrifiers in MLVSS). Although nitrification did occur (as indicated by the TKN removal of 83.2 percent), there were considerable losses of suspended solids in the nitrification zone as indicated by the clarifier effluent of 48 ppm. This mode of operation resulted in an actual decrease in final effluent quality, i.e., the clarifier suspended solids concentration in the first step was only 27 ppm. Further, observation of the nitrification zone on a daily basis showed that the MLVSS was decreasing and continued operation under these conditions would have resulted in complete loss of nitrification. It is evident from the Phase I data that the low $BOD_5$ influent to the second step was unsatisfactory; the low carbon food concentration was not sufficient to maintain Phase II operation of the pilot plant was with a higher feed flow rate to the first step (F/M = 0.53) and resulted in better first step effluent ($BOD_5$ = $_{13.5}$ ppm.) due to more optimum carbon food loading. However, the basic result was the same as for Phase I as evidenced by an increase of $BOD_5$ effluent from the first to second step. Again, solids level in the second step decreased and continued operation would have resulted in loss of second step nitrification. It should also be noted that for both Phase I and II, the first step effluent had $BOD_5$ concentration below 20 ppm., the lower limit for the method of this invention.

Phase III operation of the pilot plant was at a high first step loading (F/M — 1.19) and the effluent was of relatively poor quality. However, it contained 27.7 ppm. $BOD_5$ which was sufficient to maintain the carbon-consuming microorganisms in the nitrification zone at a constant concentration over a 9 day period. The Phase III data indicates that the total $BOD_5$ removal was high (90 percent), the nitrogenous oxygen demand removal was high (87.8 percent) and the second step clarifier effluent suspended solids concentration was low (30 ppm.). In summary, the Phase III data indicates that by practicing this invention the system was able to sustain an equilibrium population of both carbon-consuming and nitrogen-consuming microorganisms in the second step.

Figure 6:
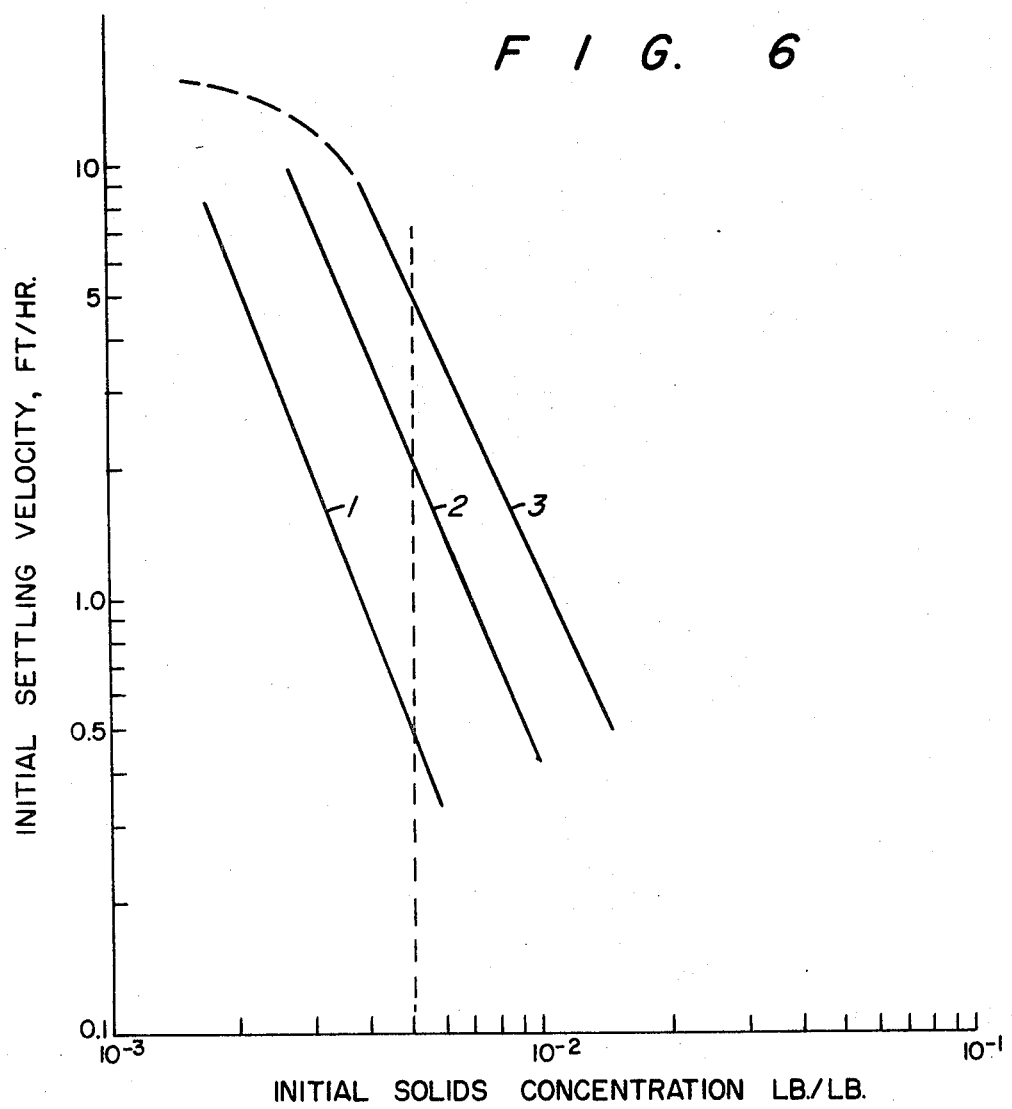
FIG. 6 is a graph showing the improved settling characteristics of the nitrifying sludge of this invention as compared with prior art nitrifying sludge.

The FIG. 6 graph compares the nitrifying sludge settling characteristics of this invention and the prior art. Curve 1 represents published data for the second step of a two step air aerated system, curve 2 represents published and unpublished data for the second step of a two step air aerated system using alum as a settling aid, and curve 3 represents data from operation of the aforedescribed pilot plant under Phase III conditions. It is apparent from this data that the curve 3 sludge settling characteristics are substantially superior to the air system sludge even when settling aids are used with the latter. For example, at an initial solids concentration of $5 \times 10^{-1}$ lb./lb., the initial settling velocities are about 0.5 ft./hr. for air system sludge, 2 ft./hr. for air system sludge with alum settling aid, and 5 ft./hr. for the sludge produced by this method.

Although preferred embodiments of this invention have been described in detail, it will be appreciated that other embodiments are contemplated along with modifications of the disclosed features, as being within the scope of the invention.

What is claimed is:

1. In a method for treating BOD-containing water by aeration in contact with activated sludge, settling sludge from the aeration and recycling sludge to the aeration zone as said activated sludge wherein the carbon food in said water is biochemically oxidized with at least 50 percent oxygen (by volume) feed gas, the improvement comprising: passing a feed stream comprising at least in part the carbon-depleted effluent water to a nitrification zone, said feed stream having sufficient carbon food, non-viable material and carbon-consuming microorganisms for a total $BOD_5$ of 20–100 ppm. and also having nitrogen food; introducing at least 50 percent oxygen (by volume) feed gas and nitrifying sludge recycle to said nitrification zone; mixing the fluids in said nitrification zone and simultaneously recirculating one fluid against the other fluids to form oxygenated liquor having (a) volatile suspended solids (MLVSS) population comprising both 2–40 percent nitrogen-consuming microorganisms and 98–60 percent carbon-consuming microorganisms plus non-viable material, (b) suspended solids content (MLSS) of 2,000–10,000 ppm. with MLVSS/MLSS of at least 0.4, for a liquid contact time of 30–240 minutes; maintaining the dissolved oxygen content (DO) of the liquor at least at 2 ppm. during the mixing and recirculating; releasing oxygen-depleted aeration gas of at least 20 percent oxygen (by volume) content from the nitrification zone; settling nitrifying sludge from nitrification zone; withdrawing and wasting the settled sludge at rate such that the sludge retention time (SRT) in the nitrification zone is 3–20 days and recycling part of same as said nitrifying sludge recycle; and maintaining the carbon food, non-viable material and carbon-consuming microorganisms/biomass ratio at 0.03–0.60 pounds $BOD_5$/day $x$ pound volatile suspended solids (MLVSS).

2. A method according to claim 1 wherein the carbon food, non-viable material and carbon-consuming microorganisms/biomass ratio in said aeration zone is 0.08–2 pounds $BOD_5$/day $x$ pound volatile suspended solids, said carbon-depleted effluent water comprises the entire feed stream to said nitrification zone and has 25–100 ppm. $BOD_5$, and the carbon food, non-viable material and carbon-consuming microorganisms/biomass ratio in the nitrification zone is maintained at 0.12–0.50 pounds $BOD_5$/day $x$ pound volatile suspended solids.

3. A method according to claim 1 wherein the carbon food, non-viable material and carbon-consuming microorganisms/biomass ratio in said aeration zone is 0.3–0.8 pounds $BOD_5$/day $x$ pound volatile suspended solids, the feed stream to said nitrification zone comprises said carbon-depleted effluent water and a secondary $BOD_5$ source.

4. A method according to claim 3 wherein the feed stream to said nitrification zone comprises said carbon-depleted effluent water and a minor portion of said BOD-containing water untreated in said aeration zone.

5. A method according to claim 3 wherein the feed stream to said nitrification zone comprises said carbon-depleted effluent water and a minor portion of the settled activated sludge from said aeration zone.

6. A method according to claim 3 wherein the feed stream to said nitrification zone comprises said carbon-depleted effluent water and a minor portion of aeration zone liquor.

7. A method according to claim 1 wherein said nitrification zone comprises a multiplicity of separate sub-zones; said oxygen feed gas, feed stream and nitrifying sludge recycle are all introduced to a first sub-zone for mixing and simultaneous fluid recirculation therein to form a first oxygenated liquor and a first oxygen-depleted aeration gas, said first oxygenated liquor and said first oxygen-depleted aeration gas are separately withdrawn and each introduced to a second sub-zone for further mixing and simultaneous fluid recirculation therein to form a second further oxygenated liquor and second further oxygen-depleted aeration gas, said second further oxygenated liquor and said second further oxygen-depleted aeration gas are separately withdrawn from said second sub-zone and each introduced to any remaining sub-zones for further mixing and fluid recirculation in the same cocurrent flow direction as said first and second sub-zones, the aeration gas from the final 44 sub-zone is released as said oxygen-depleted aeration gas of at least 20 percent oxygen (by volume) content, and the oxygenated liquor from said final sub-zone is withdrawn for said settling of nitrifying sludge.

8. A method according to claim 1 wherein said liquid contact time in the nitrification zone is 60–120 minutes.

9. A method according to claim 2 wherein the liquid contact time in the nitrification zone is greater than the liquid contact time in the aeration zone.

10. A method according to claim 1 wherein the sludge retention time (SRT) in the nitrification zone is at least twice the sludge retention time in the aeration zone.

11. A method according to claim 1 wherein the sludge retention time (SRT) in the nitrification zone is 5–15 days.

12. A method according to claim 1 wherein the dissolved oxygen content (DO) of the nitrification zone liquor is maintained at 4–10 ppm.

13. A method according to claim 1 wherein the nitrification zone liquor has volatile suspended solids (MLVSS) population comprising 2–25 percent nitrogen-consuming microorganisms and 98–75 percent carbon-consuming microorganisms and non-viable material.

14. A method according to claim 2 wherein the carbon-depleted effluent water has 30–60 ppm. $BOD_5$, and the carbon food and carbon-consuming microorganisms/biomass ratio in the nitrification zone is maintained at 0.2–0.4 pounds $BOD_5$/day $x$ pound volatile suspended solids.

15. A method according to claim 3 wherein the carbon-depleted effluent water has 20–80 ppm. $BOD_5$, and the carbon food and carbon-consuming microorganism/biomass ratio in the nitrification zone is maintained at 0.05–0.5 pounds $BOD_5$/day $x$ pound volatile suspended solids.

* * * * *

UNITED STATES PATENT OFFICE
CERTIFICATE OF CORRECTION

Patent No. 3,764,523                    October 9, 1973

Inventor(s) Michael J. Stankewich, Jr.

It is certified that error appears in the above-identified patent and that said Letters Patent are hereby corrected as shown below:

Claim 7, column 18, line 29, delete "44"

Signed and sealed this 26th day of February 1974.

(SEAL)
Attest:

EDWARD M. FLETCHER, JR.          C. MARSHALL DANN
Attesting Officer                Commissioner of Patents